United States Patent [19]

Kamata

[11] Patent Number: 4,469,421
[45] Date of Patent: Sep. 4, 1984

[54] CAMERA WITH PIVOTABLE BACK DOOR AND SLIDABLE FILM LOADING DOOR

[75] Inventor: Kazuo Kamata, Tokyo, Japan
[73] Assignee: Fuji Photo Film Co., Ltd., Kanagawa, Japan
[21] Appl. No.: 498,099
[22] Filed: May 25, 1983

[30] Foreign Application Priority Data

May 28, 1982 [JP] Japan .............................. 57-78760[U]
Aug. 19, 1982 [JP] Japan ........................... 57-125390[U]

[51] Int. Cl.³ ........................ G03B 1/00; G03B 17/02
[52] U.S. Cl. ..................................... 354/212; 354/288
[58] Field of Search ...................... 354/212, 288, 202; 242/71.1

[56] References Cited

U.S. PATENT DOCUMENTS

| | | | |
|---|---|---|---|
| 4,214,830 | 7/1980 | Schroder | 354/202 |
| 4,303,325 | 12/1981 | Seely | 354/212 |
| 4,314,751 | 2/1982 | Harvey | 354/212 |
| 4,324,476 | 4/1982 | Seely | 354/288 |

FOREIGN PATENT DOCUMENTS 2084341 7/1983 United Kingdom.

Primary Examiner—A. A. Mathews
Attorney, Agent, or Firm—Young & Thompson

[57] ABSTRACT

A camera of the type in which a film magazine is inserted axially into a film loading chamber, has a film loading door rectilinearly movable for closing and opening the film loading chamber, and a back door pivotally mounted on the back of the camera for closing and opening a guideway between a film pressure plate and the camera body. Rectilinear movement of the film loading door to its open position causes a latching member to disengage itself with the back door. On the other hand, the film loading door is restricted in its open position by engagement with the latching member and, in turn, allowed to return under the influence of a spring force to its closed position by pivotal movement of the back door which releases this engagement.

9 Claims, 9 Drawing Figures

CAMERA WITH PIVOTABLE BACK DOOR AND SLIDABLE FILM LOADING DOOR

BACKGROUND OF THE INVENTION

The present invention relates to a photographic camera of the type wherein a film magazine containing a roll of 35 mm strip film is inserted axially into a film loading chamber that opens at the bottom of the camera and, more particularly, to a camera having an improved door construction wherein a film loading door slidably mounted on and rectilinearly movable along the bottom for opening and closing the film loading chamber and a back door pivotably mounted on the back of the camera for opening and closing a guideway into which a film leader previously drawn out of the magazine is inserted, cooperate with each other.

In conventional still cameras for use with magazines containing a roll of 35 mm strip film, before the camera is loaded, a back door is fully opened. A magazine in a correct position is inserted into a film loading chamber of the camera and then a film leader previously drawn out of the magazine is wound around a take-up spool in a film take-up chamber The back door is closed to complete the film loading. This film loading procedure is complicated and require troublesome operations. For this reason, inexperienced users cannot perform film loading satisfactorily, with the result that in that no picture is taken because of the failure to wind the film.

To eliminate the foregoing disadvantages, there have recently been proposed cameras of the type wherein a magazine is inserted or dropped axially into a film loading chamber that opens at the bottom of the camera for film loading. Such a camera is disclosed, for example, in U.S. Pat. No. 4,324,476. In such a camera, there is provided a door apparatus comprising a flap-like back door pivotally mounted on the back of the camera and a flap-like bottom door pivotally mounted on the back door for opening and closing the bottom of the camera. In the camera, however, the open film loading door, which swings through an angle of about 90°, not only makes the camera cumbersome but also provides too large an opening at the bottom, thereby allowing dust and other foreign particles to enter the camera.

On the other hand, there have been proposed cameras using magazines containing a rool of 35 mm strip film adapted automatically to wind a film leader around a film take-up spool without inserting the loading end of the film leader into its slot. Such a camera is disclosed, for example, in U.S. Pat. No. 4,303,325, and has an improved film take-up spool which is provided with a film capturing projection that engages within an aperture in the film leader.

In the foregoing easy loading cameras, in order to make the film loading operation easier, an improved apparatus, which is adapted automatically to advance the film leader to the film take-up spool merely by closing a back door after insertion of the film magazine into the film loading chamber, has been proposed in Japanese Utility Model No. 57-74429, which has been laid open to the public. This type of camera, however, has an intricate driving mechanism for a film advancing roller which comprises a cylindrical surface engageable with the film leader and a vent surface and which is adapted to be stopped at a position where the vent surface is opposite a film passageway after having advanced the film leader. Such intricate mechanism results in high-priced cameras.

OBJECTS OF THE INVENTION

It is therefore the principal object of the present invention to provide a camera wherein the fully opened film loading door does not render the camera bulky.

It is another object of the present invention to provide a camera wherein the open film loading door provides a narrow space for loading a film so as to ensure that the camera interior is kept free of dust and other foreign particles.

It is a further object of the present invention to provide a camera wherein closing the film loading door causes a film leader to be drawn out sufficiently to reach the film take-up spool.

It is an additional object of the present invention to provide a camera having a mechanism for drawing out a film leader upon loading the camera, which mechanism is simple in construction and inexpensive.

SUMMARY OF THE INVENTION

These and other objects of the present invention are achieved by providing a film loading door slidably mounted on and rectilinearly movable along the bottom of a camera body for opening and closing a film loading chamber that opens at the bottom and into which a film magazine is inserted endwise. Rectilinear movement of the film loading door to its open position causes a locking or latching member to be displaced so as to release a back door from its closed position.

In a preferred embodiment of the present invention, the back door in its engaged or closed position is released by rectilinear movement of the film loading door to its open position and, conversely, the latter is closed in cooperation with the former being closed. The film loading door is provided with a rack whose motion is transmitted through a pinion to a film leader advancing means, for instance sprockets or an advancing roller which advances the film leader a distance sufficient to reach the film take-up spool and to be wound therearound.

BRIEF DESCRIPTION OF THE DRAWINGS

The present invention will become more apparent from the following description of a preferred embodiment thereof as shown in the accompanying drawings, in which.

DETAILED DESCRIPTION OF THE INVENTION

Figure 1:
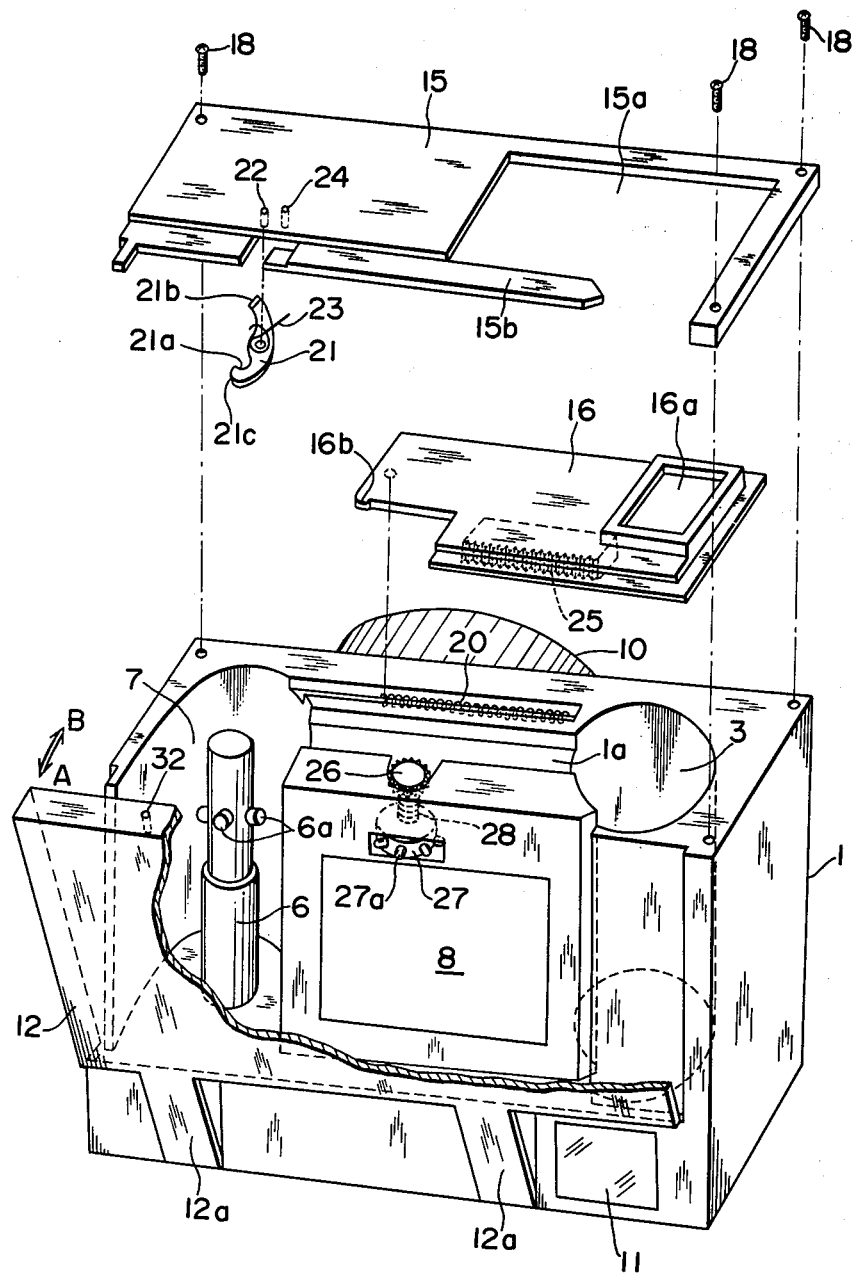
FIG. 1 is an exploded bottom perspective view of a preferred embodiment of a camera according to the present invention.

At the outset, it is to be noted that like parts are designated by like reference numerals and symbols throughout the figures of the accompanying drawings.

Referring now to the drawings in greater detail, and first to FIGS. 1 to 4, there is shown a camera 1 provided with a film loading chamber 3 into which a film magazine 2 is inserted endwise, i.e., axially, a film take-up chamber 7 wherein a film take-up spool 6 having film capturing projections 6a for engaging in an aperture 5 in a film leader 4 is rotatably mounted so as automatically to wind the film leader 4 therearound, and an exposure aperture 8. In these figures, the numerals 10 and 11 denote an objective lens and a view finder, respectively.

Figure 2:
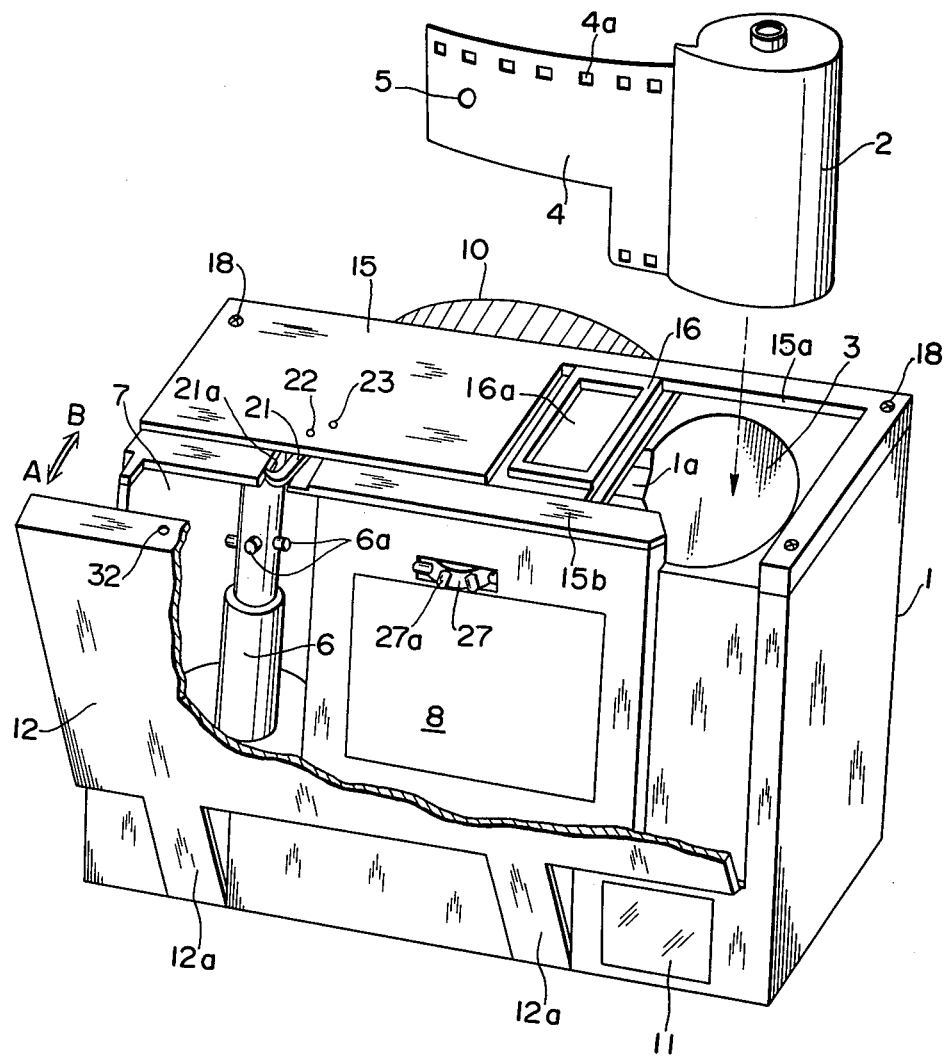
FIG. 2 is a bottom perspective view of the camera during film loading, with the back door open.
Figure 3:
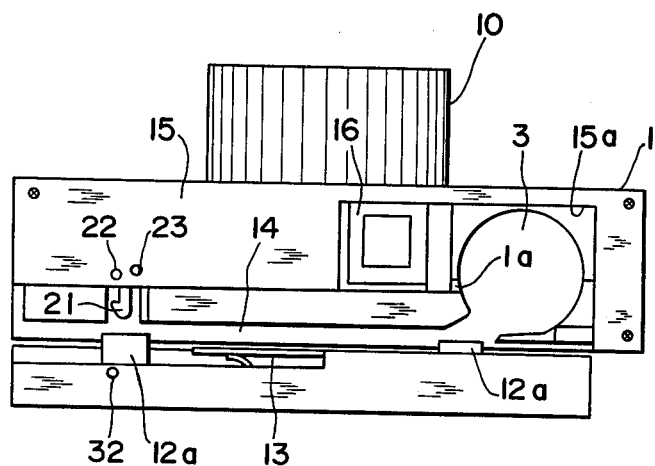
FIG. 3 is a bottom plan view thereof.

A camera back door 12 is hinged by arms 12a to the camera body 1 at its upper portions (the arms are shown at the bottom of FIG. 2 because the camera is shown upside down), for pivotal movement in the direction shown by the arrow A-B in FIGS. 1 and 2. The back door 12 can be partially opened to uncover a bottom portion of the camera body 1 so as to move a film pressure plate 13 away from the camera interior, thereby to provide a guideway for guiding the film leader 4 upon film loading.

A bottom plate 15 secured to the camera body 1 supports a film loading door 16 which is slidably mounted in and rectilinearly movable along an opening 15a of the bottom plate 15 for opening the camera to uncover the film loading chamber 3. As shown in FIGS. 1 and 2, there is provided a guide member 15b for guiding the film leader 4 when the magazine 2 is inserted into the film loading chamber 3. The film loading door 16 can slide longitudinally in a space defined between the camera body 1 and the bottom plate 15 between open and closed positions thereby respectively to uncover and cover the film loading chamber of the camera 1. The film loading door 16, as shown in FIG. 1, is urged by a spring 20 toward its closed position to cover the loading chamber 3.

To the right of the loading door 16 a recess 16a is provided to afford a steady grip for the fingers, and at the opposite end thereof a projection 16b is provided so as to coact with the back door 12 when the loading door 16 moves. The numeral 21 denotes a latching member for the back door 12 which is supported for pivotal movement on a fixed pivot pin 22 on the bottom plate 15 and is urged counterclockwise by a spring 23 as shown in FIG. 1. This pivotal movement is restricted by a pin 24.

As shown in FIG. 1, a rack 25 which is fixed inside the loading door 16 is slidably received in a U-shaped groove 1a in the camera body 1 so as to threadedly engage with a pinion 26 at the bottom of the camera 1 (at the top in FIG. 1). A sprocket wheel 27 with teeth 27a on the periphery thereof is connected to the pinion 26 through a one-way clutch 28 to rotate, upon closing the loading door 16, in a direction to advance the film leader 4 toward the film take-up chamber 7. However, the rotation of the pinion 26 in the opposite direction, which would otherwise be caused by opening the loading door, is prevented by the one-way clutch 28, whereby the sprocket wheel 27 remains at rest.

Figure 5:
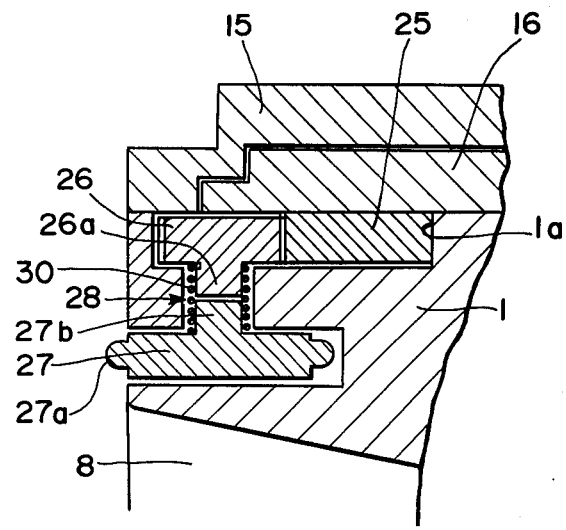
FIG. 5 is an enlarged fragmentary cross-sectional view of the film leader advancing mechanism.

Referring now to FIG. 5, there is shown the one-way clutch mechanism 28 in greater detail. In this mechanism, a coil spring 30 is spirally and clockwise wound around a shaft 26a of the pinion 26, and at its one end, positively secured to the shaft 26a. On the other hand, the lower portion of the coil spring 30 constrictively encloses a shaft 27a of the sprocket wheel 27. It will of course be understood that other well-known one-way clutch means may be used in place of the mechanism shown in FIG. 5. The rack and pinion are disengaged from each other when the loading door 16 is in closed position, thus enabling the sprocket wheel 27 to rotate freely and to remain engaged in the perforation 4a of the film when the film is wound and rewound.

Figure 4:
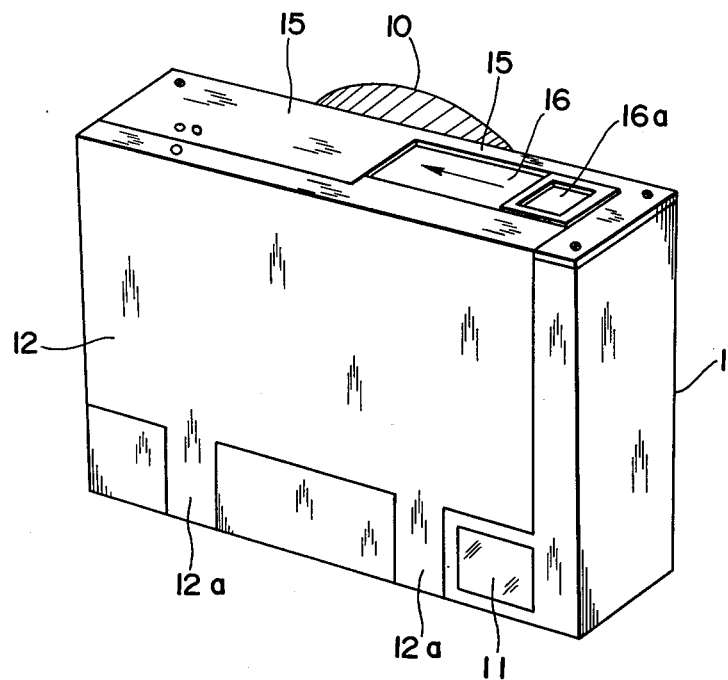
FIG. 4 is a bottom perspective view of the camera with both doors closed.
Figure 6:
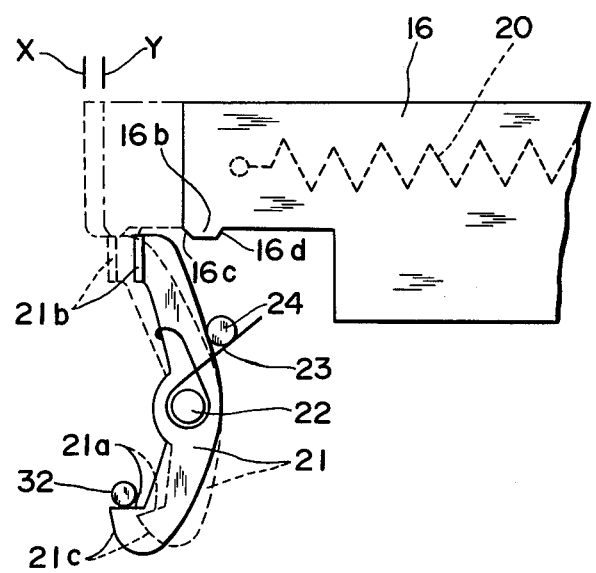
FIG. 6 is an enlarged fragmentary view of the latching structure for the back door.

The film loading operation of the camera of the present invention is as follows:

During film loading, and with the camera back door 12,16 in closed position as shown in FIG. 4, the rectilinear movement of the film loading door 16 against the force of the spring 20 in the direction shown by an arrow in FIG. 4 causes abutment of the projection 16b at its left side 16c against a tail end 21b of the latching member 21 and then rotates the latter against the force of spring 23 counterclockwise to the position shown by the dotted lines in FIG. 6. At the same time, the engagement between a pin 32 on the back door 12 and a hook 21c on the latching member 21 is released, thereby to permit swinging the back door 12 from a closed position to a partially open position.

When the loading door 16 is further moved rectilinearly to the position X shown by the dotted lines in FIG. 6, the projection 16b overrides the tail end 21b of the latching member 21 so as to allow the latching member 21 to return to its initial position. The latching member 21 in this initial position then restricts the motion of the loading door 16 to a closed position by an engagement of the right side 16d of the projection 16b with the tail end 21b of the latching member, thereby holding the loading door 16 in the open position Y shown in phantom line in FIG. 6.

At the commencement of opening of the loading door 16, the rack 25 is brought into engagement with the pinion 26 and then rotates the latter. However, no motion of the pinion 26 is then transmitted to the sprocket wheel 27, because of the one-way clutch 28.

After the loading door 16 is fully open, the magazine 2 is inserted endwise, i.e., axially, into the film loading chamber 3 from the bottom of the camera. Then, the previously drawn out film leader 4 is guided by the guide member 15b and inserted edgewise, i.e., longitudinal edge first, into the guideway 14 provided between the film pressure plate 4 and the body 1. After this insertion operation, closing the back door 12 forces the pin 32 to abut against the back side of the hook 21c of the latching member 21 and to rotate it counterclockwise against the force of spring 23, thereby disengaging the tail end 21b from the projection 16b of the loading door 16. As a result, the loading door 16, urged by the spring 20, is automatically closed so as to cover and close the film loading chamber 3.

Figure 7A:
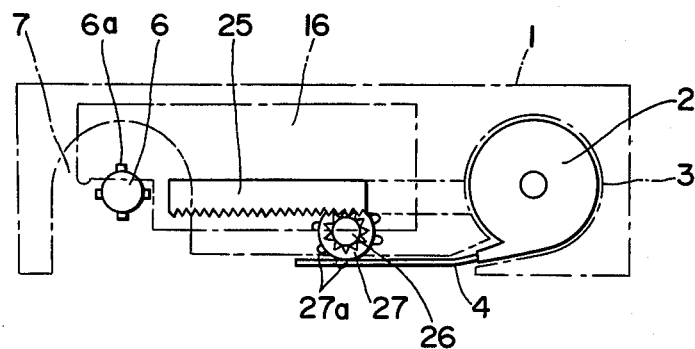
FIGS. 7(A) to (C) are diagrammatic bottom plan views illustrating the various positions of the film leader advancing mechanism.
Figure 7B:
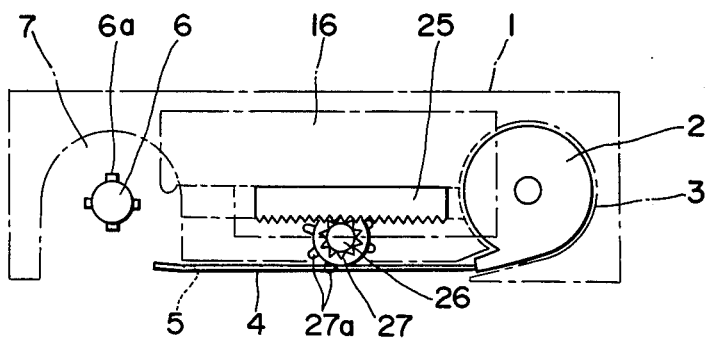

At the same time, the motion of the loading door, and hence of the rack 25, is transmitted to the pinion 26 and then to the sprocket wheel 27 through the one-way clutch 28. Consequently, the film leader 4 with its perforations engaged with teeth 27a of the sprocket wheel 27 is drawn out of the film magazine 2 as shown in FIGS. 7(A) to (C).

Figure 7C:
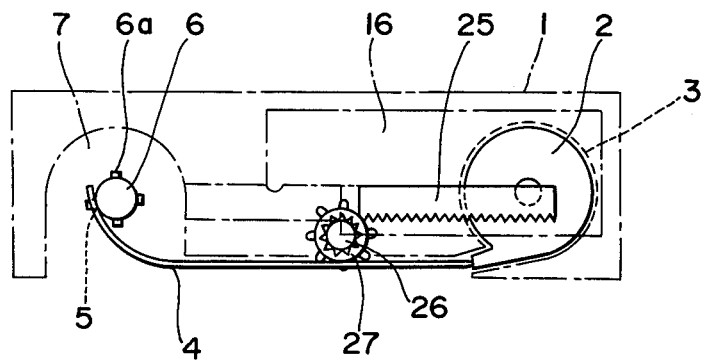

Referring in particular to FIG. 7(C), upon fully closing the loading door 16, the rack 25 is disengaged from the pinion 26, and the film leader 4 with its perforations 4a engaged with teeth 27a of the sprocket wheel 27 is drawn out of the film magazine 2 a distance sufficient to reach the film take-up spool 6 in the take-up chamber 7.

As is well known in the art, the take-up spool 6 can automatically wind up the film leader 4 with the film leader aperture 5 engaged by the capturing projections 6a.

After the film loading has been completed, the lack of engagement between the rack and the pinion allows the sprocket wheel 27 to rotate freely relative to the loading door 16, so that the sprocket wheel 27 is useful in combination with the frame counter, a film advancement indicator or the like. It should also be noted that the one-way clutch 28 may disconnect the pinion and sprocket wheel from engagement with each other either when the film loading door is closed or when the film is rewound, instead of disengagement of the rack and pinion.

Although the present invention has been described and illustrated in connection with a preferred embodiment, it is to be understood that modifications and variations may be resorted to, without departing from the spirit of the invention. Such modifications and variations are considered to be within the purview and scope of the present invention as defined by the appended claims.

What is claimed is:

1. In a camera of the type in which a magazine containing a roll of strip film is inserted axially into a film loading chamber in the camera while an elongated film leader previously drawn out from the magazine is inserted into a guideway disposed between a film pressure plate and the body of the camera; the improvement comprising:
   a film loading door slidably mounted for rectilinear movement on and along the bottom of said camera body for opening and closing the bottom of said film chamber;
   a back door pivotably mounted at the back of said camera body for opening and closing said guideway; and
   a latching member for latching said back door in its closed position thereby closing said guideway, said latching member releasing said back door responsive to rectilinear movement of said film loading door to its open position thereby opening said film loading chamber.

2. A camera as claimed in claim 1, wherein said latching member has a latching portion and is urged by a spring, said latching member being adapted to rotate, against the force of said spring, from a first position wherein said latching portion is in engagement with a pin on said back door, to a second position wherein said latching portion is disengaged from said pin, responsive to rectilinear movement of said film loading door.

3. A camera as claimed in claim 2, wherein said film loading door is urged by a spring toward a closed position, thereby closing said film loading chamber.

4. A camera as claimed in claim 3, wherein said latching member has a tail end and a slanted end which are abutted by a projection on said loading door and said pin, respectively.

5. A camera as claimed in claim 4, wherein at the commencement of rectilinear movement of said film loading door, said projection abuts the tail end of said latching member and then causes it to rotate so as to disengage said latching portion from said pin, thereby to open said back door and, upon rectilinear movement of said film loading door, said projection overrides said tail end to restrict return of said film loading door to its closed position, said loading door returning to its closed position upon rotation of said latching member by engagement of said pin with said slanted end when said back door is closed.

6. A camera as claimed in claim 1, further comprising film leader advancing means for advancing said previously drawn out film leader to a film take-up chamber, and transmission means for transmitting said rectilinear movement of said film loading door to its closed position to said film leader advancing means.

7. A camera as claimed in claim 6, wherein said transmission means comprises a rack positively secured to said film loading door, a pinion threadedly engaged with said rack, and a one-way clutch interposed between said pinion and said film leader advancing means.

8. A camera as claimed in claim 7, wherein said one-way clutch is a coil spring of which one end is secured to a shaft of said pinion and a part of which constrictively encircles a shaft of said film leader advancing means.

9. A camera as claimed in claim 8, wherein said film leader advancing means is a rotatable sprocket wheel with teeth engageable with perforations in said film leader.

* * * * *